United States Patent Office 3,399,056
Patented Aug. 27, 1968

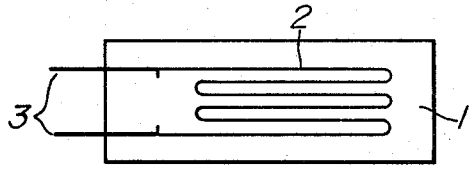
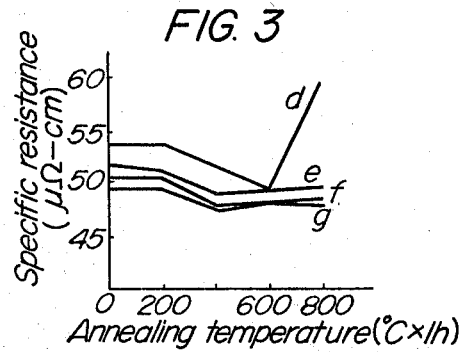
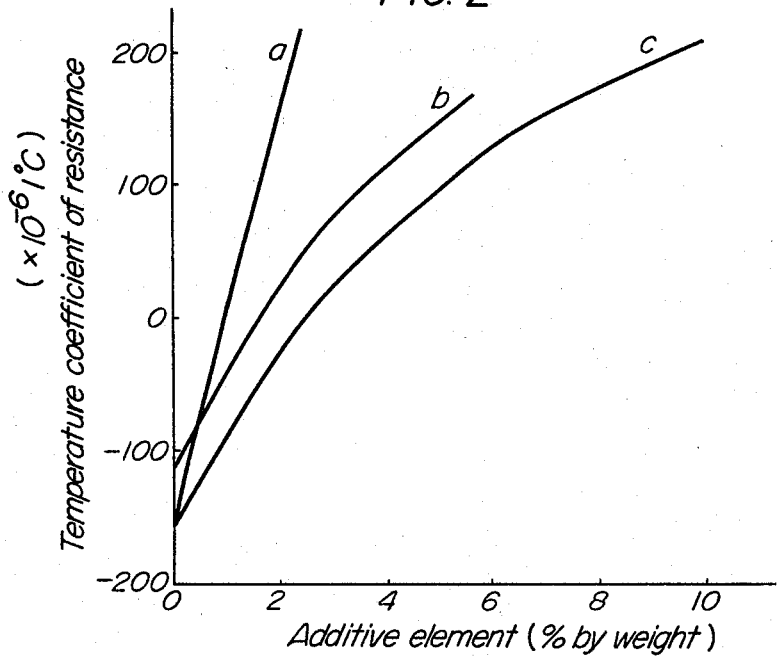

3,399,056
ELECTRICAL RESISTANCE ALLOYS
Toshio Doi, Tokyo, Japan, assignor to Hitachi, Ltd., Tokyo, Japan, a corporation of Japan
Filed Apr. 8, 1966, Ser. No. 541,291
Claims priority, application Japan, Apr. 12, 1965, 40/21,185
4 Claims. (Cl. 75—159)

This invention relates to electrical resistance alloys and more particularly to those of the type containing copper and nickel as major components and is intended to provide a resistance alloy in germanium-addition usable as a strain gauge material particularly with self-compensating type strain gauges.

As is well known, strain gauges used the change of electrical resistance of a gauge wire when subjected to deformation to measure mechanical strains and are not only used widely in various strain measurements but also are utilized in self-balancing recorders and other industrial instruments as an element for converting mechanical displacement into an electrical variable.

Strain gauges commonly take the form of a grid of fine metal wire or foil 2 arranged on a flexible insulating substrate 1, for example, of paper, Bakelite-impregnated paper, or polyester sheet, as shown in FIG. 1 of the accompanying drawings, and in use, are bonded to the object whose deformations under stress are to be determined. The change in resistance of the strain gauge wire 2 is corresponding to a measure of the mechanical strain of the object structure. Reference numeral 3 in FIG. 1 indicates lead wires.

Accuracies in strain measurements are generally affected by the environment, material used, measuring time and other factors and, among others, the temperature change during measurement is the most important particularly in measurements of static strains. Accordingly, in order to enhance the measuring accuracy, some measure of temperature-compensation should be taken to compensate for the change in temperature. The circuit compensation and self-compensation methods are known for this purpose.

Now, assume that the temperature coefficient of resistance of the strain gauge wire, when it is freely expanded, is specified by $C_f$, the gauge factor of the wire by K, the coefficient of thermal expansion of the object to be measured by $\beta_s$ and that of the gauge wire when freely expanded by $\beta_f$. Then, the temperature coefficient of resistance, $C'_f$, of the gauge wire when formed into a strain gauge is given by the formula $$C'_f = C_f + K(\beta_s - \beta_f) \quad (1)$$

In order to realize a self-compensating type strain gauge for measuring an object having a coefficient of thermal expansion $\beta_s$, it is a prerequisite to obtain a gauge wire material which exhibits such a temperature coefficient of resistance, $C_f$, that will reduce the temperature coefficient of resistance $C'_f$ of a gauge wire to zero when the wire material is formed into the gauge wire of the strain gauge.

As resistance wire materials for self-compensating type strain gauges, copper-nickel alloys have conventionally been used, the temperature coefficient of resistance of which can be varied by varying the percentage ratio between the alloy elements. However, since the temperature coefficient of resistance of this type of alloy largely varies even with the slightest change in its composition, it has been extremely difficult to obtain materials exhibiting an appropriate temperature coefficient of resistance in regard to the coefficient of thermal expansion of the objects to be measured or to obtain those having fixed characteristics, however precisely the ratio between the alloy elements be controlled.

It has been found recently that the above difficulty can be alleviated by use of alloys which comprise iron as a third element in addition to the principal alloy elements, copper and nickel. As will be seen from the curve $a$ in FIG. 2, however, the above difficulty cannot be overcome to any satisfactory extent even with copper-nickel-iron alloys, the temperature coefficient of resistance of such alloys varying to a considerably large extent with the slightest change in content of the additive element, iron.

The present invention is intended to solve the above problem encountered with such previous strain gauge materials and proposes to use germanium as an additive element in place of iron to provide a resistance wire material which can easily be made so as to exhibit a temperature coefficient of resistance, $C_f$, not variable to any substantial extent even with variations in content of the additive element and that having an appropriate value in regard to the coefficient of thermal expansion, $\beta_s$, of the given object to be measured, and which can be made to exhibit fixed characteristics.

The temperature coefficient of resistance, $C_f$, of copper-nickel-germanium alloys varies with their composition, as typically illustrated in FIG. 2. In this figure, the values of temperature coefficient of resistance $C_f(\times 10^{-6}/°C.)$ were laid off along the vertical axis and the weight percentages of germanium or iron added to copper-nickel binary alloys along the horizontal axis. Curve $a$ shows how the temperature coefficient of resistance, $C_f$, of a conventional copper-nickel-iron alloy changes as its iron content is changed with the ratio in weight of copper to nickel maintained at 55:45. Curves $b$ and $c$ show how the temperature coefficient of resistance, $C_f$, of copper-nickel-germanium alloys changes with change in content of the additive element, germanium, with the weight between copper and nickel maintained at 60:40 and 55:45, respectively.

As observed in FIG. 2, the curves for the inventive material are less steep than the curve for the conventional material; that is, the change in temperature coefficient of resistance of the inventive material with change in content of the additive element is much less than that of the conventional material. This means that, according to the present invention, resistance wire materials for strain gauges can be obtained with ease which exhibit an appropriate temperature coefficient of resistance, $C_f$, in regard to the coefficient of thermal expansion, $\beta_s$, of any particular object to be measured and that variations in characteristics of such materials can be much reduced. Incidentally, for the specimens used in the above comparison were used 75% cold-worked materials and the values of the temperature coefficient of resistance, $C_f$, must vary to a more or less extent with the annealing of the materials.

As described hereinbefore, strain gauges of the self-compensating type can be obtained by use of a gauge wire selected to exhibit a temperature coefficient of resistance, $C_f$, which reduces $C'_f$ in the Formula 1 to zero for the coefficient of thermal expansion, $\beta_s$, of the object to be measured.

In order to manufacture strain gauges of the self-compensating type by use of the inventive alloy, for example, for strain measurements of common steel, the wire material is required to have a temperature coefficient of resistance, $C_f$, of $7.8 \times 10^{-6}/°C.$ as the alloy gives a gauge ratio of 2 and a coefficient of thermal coefficient, $\beta_f$, of approximately $15.5 \times 10^{-6}/°$ C., the common steel giving a coefficient of thermal expansion, $\beta_s$, of $11 \times 10^{-6}/°$ C. Similarly, for strain measurements of stainless steel, aluminum, and magnesium alloy castings, exhibiting the coefficient of thermal expansion, $\beta_s$, of $16.4 \times 10^{-6}/°$ C., $23.8 \times 10^{-6}/°$ C. and $27.6 \times 10^{-6}/°$ C., respectively, the gauge wire material is required to have a temperature coefficient of resistance of $-3.0 \times 10^{-6}/°$ C., $17.8 \times 10^{-6}/°$ C. and $-25.4 \times 10^{-6}/°$ C., respectively. Generally, for measurements of ordinary metal materials, gauge wire materials are required to have a temperature coefficient of resistance, $C_f$, ranging between $10 \times 10^{-6}/°$ C. and $30 \times 10^{-6}/°$ C. For wider applications including strain measurements of special materials such as plastics, it is desirable to employ gauge wire materials covering an extended range of temperature coefficient of resistance, $C_f$, from $100 \times 10^{-6}/°$ C. to $-100 \times 10^{-6}/°$ C. According to the present invention, such extended range of temperature coefficient of resistance, $C_f$, can be obtained with copper-nickel-germanium alloys comprising copper and nickel in an appropriate weight ratio by varying the content of the additive element, germanium. It will be apparent from the graphical illustration of FIG. 2 that, with the alloys containing copper and nickel in the weight ratio of 60:40, from 0.2% to 3.6%, by weight, of germanium is required and for the copper to nickel ratio of 55:45, from 0.8% to 5.1%, by weight, of germanium is required.

Alloys containing copper and nickel in the weight ratio of 65:35 or higher and that of 50:50 or lower do not exhibit any negative temperature coefficient of resistance and addition of the third element, germanium, to copper-nickel alloys always causes their temperature coefficient of resistance to vary in the positive direction. Therefore, it makes substantially no sense to select the ratio in weight of copper to nickel in either of the above two ranges, one exceeding 65:35 and the other below 50:50. In addition, with the alloys containing copper and nickel in the weight ratio exceeding 65:35 or below 50:50, even the slightest change in copper or nickel content gives rise to a substantial change of the temperature coefficient of resistance and thus any intended effect cannot be obtained by the addition of germanium.

In the manufacture of the gauge wire material, mixing in of any impurities should be avoided as far as possible to prevent deterioration of the workability of the material and the impurity contents thereof should desirably not exceed 1% by weight.

In the case where the ratio in weight of copper to nickel was 55:45, the relationship between the percentage weight of germanium added and the gauge ratio of the 75% cold-worked material and of the same material subjected to annealing at 700° C. for one hour is as listed in the following table:

| Percentage weight of germanium added | Gauge ratio | |
|---|---|---|
| | 75% cold-worked | Annealed at 700° C. for 1 hour |
| 0.1 | 2.07 | 1.98 |
| 0.3 | 2.04 | 1.96 |
| 1 | 2.09 | 2.01 |
| 3 | 2.13 | 2.04 |
| 9 | 2.17 | 2.14 |

FIG. 3 graphically illustrates the relationship between the specific resistance in $\mu\Omega$-cm. and the annealing temperature in $°$ C.$\times 1$ h. copper-nickel-germanium alloys containing copper and nickel in the weight ratio of 55:45. Curves $d$, $e$, $f$ and $g$ illustrate such relationship obtained when germanium was added in percentage weight of 9%, 3%, 1% and 0.1%, respectively.

It will be appreciated from the foregoing description that the addition of germanium according to the present invention gives advantages including increase in gauge ratio and specific resistance, in addition to the intended advantageous feature that resistance wire materials for strain gauge are readily obtainable which exhibit a desired temperature coefficient not variable to any substantial extent with variation in content of the additive element within certain limits. It will be also recognized, therefore, that the alloy, according to the present invention, is not only valuable as a strain gauge wire material but also can be widely used as an electrical resistance material, for example, to form resistance elements exhibiting a predetermined temperature coefficient.

What is claimed is:

1. A copper-nickel-germanium alloy consisting essentially of copper and nickel, the copper to nickel ratio being from 50:50 to 65:35 by weight and from 0.2% to 5.1%, by weight, of germanium; the impurity content not exceeding 1% by weight.

2. A self-compensating type strain gauge comprising a gauge wire formed of the alloy as defined in claim 1.

3. A copper-nickel-germanium alloy consisting essentially of copper, nickel, the copper to nickel ratio being from 50:50 to 65:35 by weight, and from 0.2% to 5.1% by weight of germanium.

4. A self-compensating type strain gauge comprising a gauge wire formed of the alloy as defined in claim 3.

References Cited
UNITED STATES PATENTS

| 2,556,132 | 6/1951 | Ball | 75—159 X |
| 3,103,741 | 9/1963 | Stoeckert | 75—153 X |

CHARLES N. LOVELL, *Primary Examiner.*